United States Patent
Hain et al.

(10) Patent No.: US 12,061,601 B2
(45) Date of Patent: Aug. 13, 2024

(54) TRACKING ERRORS IN DATA SET LINEAGE

(71) Applicant: SIGMA COMPUTING, INC., San Francisco, CA (US)

(72) Inventors: Joseph M. Hain, Benicia, CA (US); Benjamin D. Wiklund, Oakland, CA (US); James L Gale, San Francisco, CA (US); Julie L Lemieux, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 157 days.

(21) Appl. No.: 16/927,677

(22) Filed: Jul. 13, 2020

(65) Prior Publication Data

US 2021/0248132 A1 Aug. 12, 2021

Related U.S. Application Data

(60) Provisional application No. 62/972,234, filed on Feb. 10, 2020.

(51) Int. Cl.
| | | |
|---|---|---|
| *G06F 16/242* | (2019.01) | |
| *G06F 16/22* | (2019.01) | |
| *G06F 16/23* | (2019.01) | |
| *G06F 16/28* | (2019.01) | |

(52) U.S. Cl.
CPC .......... *G06F 16/244* (2019.01); *G06F 16/221* (2019.01); *G06F 16/2308* (2019.01); *G06F 16/2445* (2019.01); *G06F 16/283* (2019.01)

(58) Field of Classification Search
CPC .. G06F 16/244; G06F 16/221; G06F 16/2308; G06F 16/2445; G06F 16/283
See application file for complete search history.

(56) References Cited

U.S. PATENT DOCUMENTS

| | | | | |
|---|---|---|---|---|
| 5,317,686 A | * | 5/1994 | Salas | G06F 40/18 |
| | | | | 715/835 |
| 5,752,253 A | * | 5/1998 | Geymond | G06F 16/26 |
| | | | | 715/209 |
| 5,832,532 A | * | 11/1998 | Kennedy | G06Q 10/06 |
| | | | | 715/255 |

(Continued)

FOREIGN PATENT DOCUMENTS

EP    1139249 A2    10/2001

OTHER PUBLICATIONS

International Search Report and Written Opinion, PCT/US2021/017012, May 6, 2021, 11 pages.

*Primary Examiner* — Pierre M Vital
*Assistant Examiner* — Zuheir A Mheir (57) ABSTRACT

Tracking errors in data set lineage including receiving, from a user, a change to a model data set, wherein the model data set is a reusable modeling layer comprising at least a portion of a data source retrieved from a data warehouse; accessing a list of dependent worksheets utilizing the model data set as a data source wherein each dependent worksheet is configured to perform analysis on the portion of the first data source within the model data set without changing the model data set; generating an error report for the dependent worksheets utilizing the model data set; and providing, to the user, the error report for the dependent worksheets utilizing the model data set.

20 Claims, 6 Drawing Sheets

(56) References Cited

U.S. PATENT DOCUMENTS

| | | | |
|---|---|---|---|
| 6,615,220 B1* | 9/2003 | Austin | G06F 16/258 |
| 8,204,848 B2* | 6/2012 | Sinha | G06F 16/288 |
| | | | 707/600 |
| 10,268,709 B1* | 4/2019 | Suehs | G06F 16/211 |
| 10,474,765 B2* | 11/2019 | Skoropinski | G06F 3/04842 |
| 11,314,489 B1* | 4/2022 | Chartrand | G06F 8/36 |
| 2005/0273311 A1* | 12/2005 | Lautt | G06F 40/18 |
| | | | 703/22 |
| 2009/0006883 A1* | 1/2009 | Zhang | G06F 11/366 |
| | | | 714/1 |
| 2010/0057669 A1* | 3/2010 | Gandini | G06Q 10/06 |
| | | | 707/E17.001 |
| 2011/0040747 A1* | 2/2011 | Brad | G06F 16/84 |
| | | | 709/227 |
| 2011/0119288 A1* | 5/2011 | Sinha | G06F 16/217 |
| | | | 707/769 |
| 2015/0088467 A1* | 3/2015 | Skoropinski | G06F 3/04815 |
| | | | 703/1 |
| 2015/0149876 A1* | 5/2015 | Davis | G06F 16/972 |
| | | | 715/212 |
| 2016/0063630 A1* | 3/2016 | Molloy | G06F 3/04847 |
| | | | 705/36 R |

* cited by examiner

TRACKING ERRORS IN DATA SET LINEAGE

CROSS-REFERENCE TO RELATED APPLICATIONS

This application is a non-provisional application for patent entitled to a filing date and claiming the benefit of earlier-filed U.S. Provisional Patent Application Ser. No. 62/972,234, filed Feb. 10, 2020.

BACKGROUND

Field of the Invention

The field of the invention is data processing, or, more specifically, methods, apparatus, and products for tracking errors in data set lineage.

Description of Related Art

Modern businesses may store large amounts of data in remote databases within cloud-based data warehouses. This data may be accessed using database query languages, such as structured query language (SQL). However, different presentations and configurations of the data may require constructing complex queries, which may be difficult for most users. Further, different users may retrieve and organize data from the database in different ways, leading to multiple different views of the same data.

SUMMARY

Methods, systems, and apparatus for tracking errors in data set lineage. Tracking errors in data set lineage includes receiving, from a user, a change to a model data set, wherein the model data set is a reusable modeling layer comprising at least a portion of a data source retrieved from a data warehouse; accessing a list of dependent worksheets utilizing the model data set as a data source wherein each dependent worksheet is configured to perform analysis on the portion of the first data source within the model data set without changing the model data set; generating an error report for the dependent worksheets utilizing the model data set including, for each dependent worksheet in the list of dependent worksheets utilizing the model data set: rebuilding the dependent worksheet with the change to the model data set; and determining whether the rebuilt dependent worksheet causes at least one error; and providing, to the user, the error report for the dependent worksheets utilizing the model data set.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
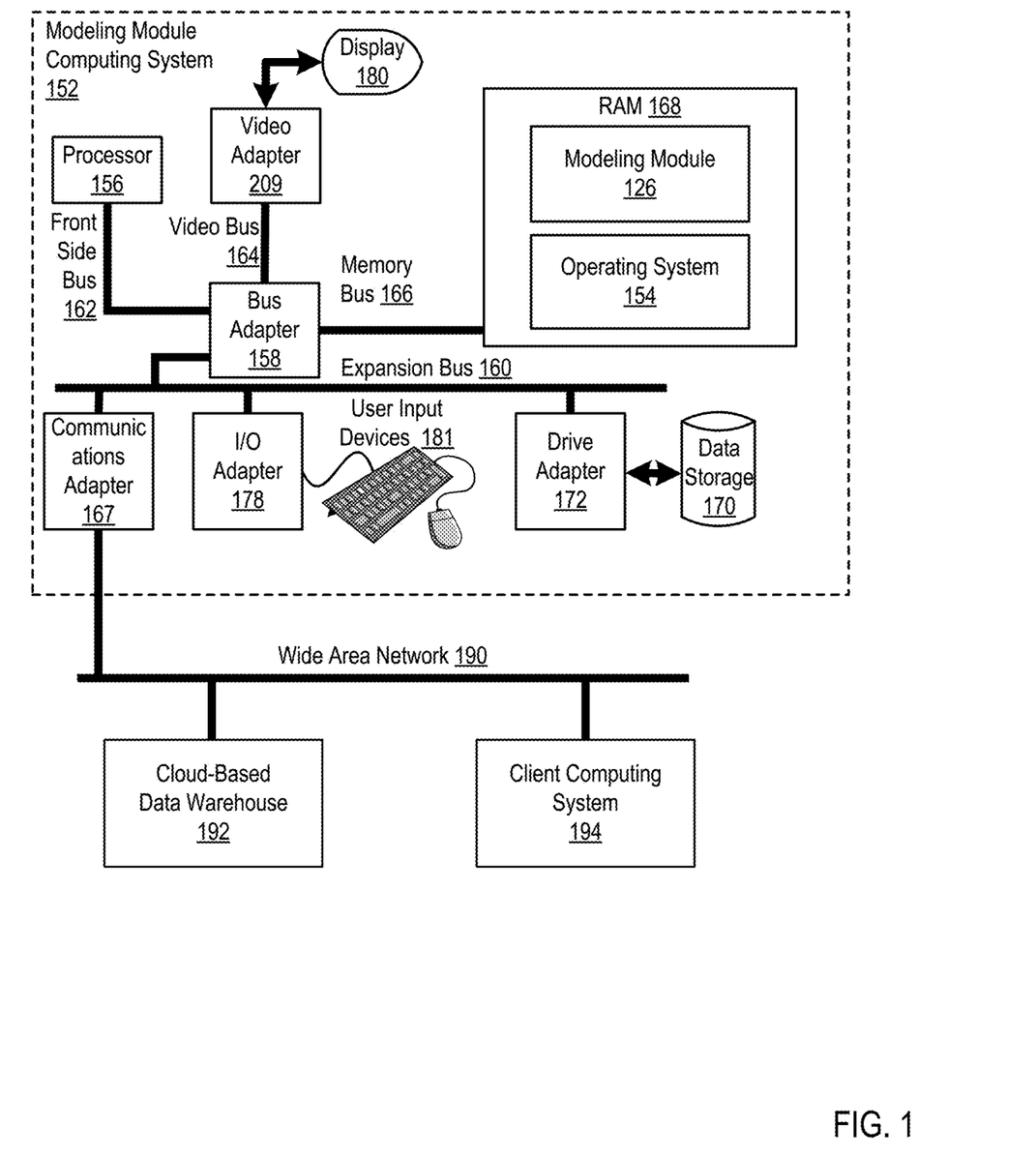
FIG. 1 sets forth a block diagram of an example system configured for tracking errors in data set lineage according to embodiments of the present invention.

Exemplary methods, apparatus, and products for tracking errors in data set lineage in accordance with the present invention are described with reference to the accompanying drawings, beginning with FIG. 1. FIG. 1 sets forth a block diagram of automated computing machinery comprising an exemplary computing system (152) configured for tracking errors in data set lineage according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for tracking errors in data set lineage according to embodiments of the present invention include UNIX™, Linux™, Microsoft Windows™, AIX™ and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the modeling module (126), a module for tracking errors in data set lineage according to embodiments of the present invention.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for tracking errors in data set lineage according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for tracking errors in data set lineage according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client computing system (194) is a computing system that accesses the database using the modeling module (126) on the computing system (152).

Figure 2:
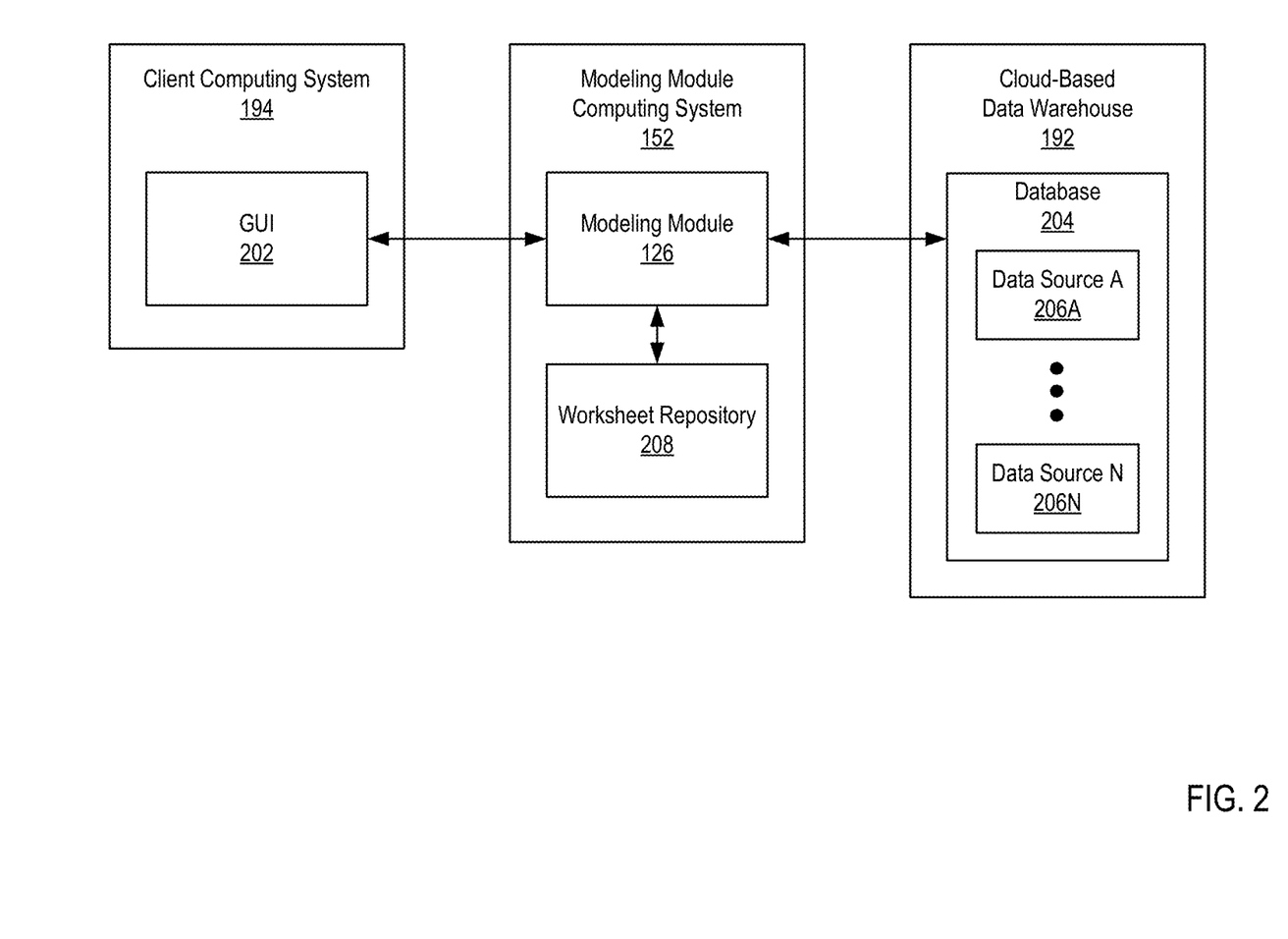
FIG. 2 sets forth a block diagram of an example system configured for tracking errors in data set lineage according to embodiments of the present invention.

FIG. 2 shows an exemplary system for tracking errors in data set lineage according to embodiments of the present invention. As shown in FIG. 2, the exemplary system includes a client computing system (194), a modeling module computing system (152), and a cloud-based data warehouse (192). The client computing system (194) includes a graphical user interface (GUI). The modeling module computing system (152) includes a modeling module (126) and a worksheet repository (208). The cloud-based data warehouse (192) includes a database (204). The database (204) includes a number of data sources (data source A (206A), data source N (206N)).

The GUI (202) is a visual presentation configured to present worksheets to a user. A worksheet is a presentation of data from one or more data sources. Such data sources may include data sources (data source A (206A), data source N (206N)) from a database (204) or other worksheets. The GUI (202) also receives requests from a user (via a user account) for data from the database (206). The GUI (202) may be presented, in part, by the modeling module (126) and displayed on a client computing system (194) (e.g., on a system display or mobile touchscreen). The GUI (202) may be part of an Internet application that includes the modeling module (126) and is hosted on the modeling module computing system (152).

The cloud-based data warehouse (192) hosts the database (204). The database (204) is a collection of data sources (data source A (206A), data source N (206N)) and a management system for the data. A data source (data source A (206A), data source N (206N)) is a collection of related data on the database (204). Examples of data sources include tables, schemas, and folders. Data from the data sources (data source A (206A), data source N (206N)) may be organized into columns and rows. The particular columns, rows, and organization of the columns and rows that make up data may be specified in the database query requesting the data.

The modeling module (126) may be a client of the database (204) without heighted access permissions. Specifically, the modeling module (126) may not be authorized to make changes to the database (204) and be limited to database queries for data from the data sources on the database (data source A (206A), data source N (206N)).

The modeling module (126) is hardware, software, or an aggregation of hardware and software configured to receive requests from the client computing system (194), via the GUI (GUI). The modeling module (126) is also configured to generate database queries in response to requests for data and manipulations of that data via the spreadsheet interface in the GUI (202). The modeling module (126) may be part of a database query generator that generates the database query.

The modeling module (126) presents, via the spreadsheet interface in the GUI (202), a worksheet using the information in the worksheet metadata. Worksheet metadata is data that describes a worksheet. Specifically, the worksheet metadata may include a description of the data sources and a worksheet architecture. Worksheets are presented by generating a database query using the description of the data sources in the worksheet metadata. Once the results of the database query are received, the received data is arranged according to the worksheet architecture. The description of the data sources describes which data is to be requested via the database query or retrieved from another worksheet (e.g., from the worksheet repository (208). The description of the data sources may include which columns and rows of data from the data source are to be retrieved from the database (206) via the database query. The data presented in the worksheet may be referred to as the underlying data (i.e., the data upon which the worksheet is created).

The worksheet architecture includes the functions to be applied to the data and the presentation structure of the data. The functions to be applied to the data may include the manipulations of the data in the columns and rows received from the data source. Such manipulations may include calculation columns that apply a function to data from the data source. The presentation structure of the data may include presentation selections made by a user. The presentation structure may include the hierarchical relationship between the columns, filters applied to the data, and the manner in which the data is sorted. The presentation structure of the data may also include the GUI visibility of a particular subset of the data. GUI visibility may be altered based on filter settings of the data or on the visibility status (e.g., hidden or not hidden) of a column within the data. The presentation structure of the data may also include the formatting of the worksheet, such as the size of rows and columns.

The worksheet metadata for each worksheet is stored in the worksheet repository (208). The worksheet repository is a storage location under the control of the modeling module computing system (152). The worksheet repository (208) may be local to the modeling module computing system (152) or remotely accessible by the modeling module (126).

A model data set may be generated as a particular type of worksheet. A model data set is collection, composition, and organization of data that provides a single source of truth for that data. Further, the model data set is a reusable modeling layer that may be used as an input data source for other worksheets. The model data set may also be referred to as a semantic modeling layer. As with worksheet metadata, modeling data set metadata is data that describes a model data set. Also, as with worksheet metadata, the model data set metadata includes a description of the data sources and a worksheet architecture.

Worksheets that utilize a model data set as a data source are referred to as dependent worksheets. A dependent worksheet may be configured to perform analysis on the portion of the first data source within the model data set without changing the model data set. Specifically, the dependent worksheet may include, or have added, elements that use data in the model data set as inputs for analysis on that data. The dependent worksheet may also include other data sources to combine with the model data set. These additional data sources may include an additional model data set. While dependent worksheets utilize a model data set as a data source, the model data set is not alterable via a dependent worksheet. In other words, each dependent worksheet accesses the model data set as a read-only artifact.

As an example, consider a regional branch of a sales business that wants to provide a model data set describing the sales accounts for all salespeople to use. The head of the sales department may generate the model data set that includes a contact person for each client, contact details for the contact person, and aggregated sales information based on total sales in the business's region. This model data set may use, as input data sources, different tables from a database on a cloud-based data warehouse. Specifically, the model data set may use as accounts contact table and a sales table as data sources. The head of sales generates the model data set using the spreadsheet interface of the GUI (202). The head of sales also includes a calculation column that displays an aggregated sales total for each client over the last 12 months.

Continuing with the example, each salesperson is provided an identifier of the model data set. Using their own accounts, each salesperson creates a new worksheet using the model data set as a data source. The new worksheet allows each salesperson to perform their own analysis on the model data set. The model data set is provided to each salesperson in a view mode that prevents destructive edits to the model data set and allows additive edits to the model data set within the new worksheet.

Continuing with the example, assume that one salesperson is tasked with contacting the top five clients based on the aggregated sales total for the last 12 months, and another salesperson is tasked with the bottom five clients based on the aggregated sales total for the last 12 months. Because both salespeople are using the same model data set that calculates and presents the aggregated sales data in the same manner, both can be assured that their sources of information (the aggregated sales data) are the same. Subsequently each salesperson may perform their individual analysis on the model data set within their own worksheets.

The modeling module (126) also tracks the dependent worksheets utilizing each model data set as a data source. Information about each dependent worksheet created or edited to utilize one or more model data sets is tracked by the modeling module (126). The metadata for each dependent worksheet may include a reference to each model data set utilized as a data source. The metadata for the model data set may include a reference to each dependent worksheet utilizing the model data set as a data source. Alternatively, or additionally, the dependencies between dependent worksheets and model data sets may be stored in a separate file in the worksheet repository (208).

Continuing with the example from above, the head of sales may access a lineage tab within the GUI (202) to view each of the dependent worksheets utilizing the model data set as a data source. Assume that the head of sales removes a column from the model data set. The modeling module (126) accesses a list of the salesperson dependent worksheets that utilize the model data set as a data source. The list may be pre-existing (e.g., stored in the model data set metadata or a separate file) or may be generated dynamically (e.g., from the metadata of each dependent worksheet). Once the column is removed, each dependent worksheet is rebuilt with the removed column and evaluated for an error. Each error that arises is added to an error report and provided to the head of sales.

Figure 3:
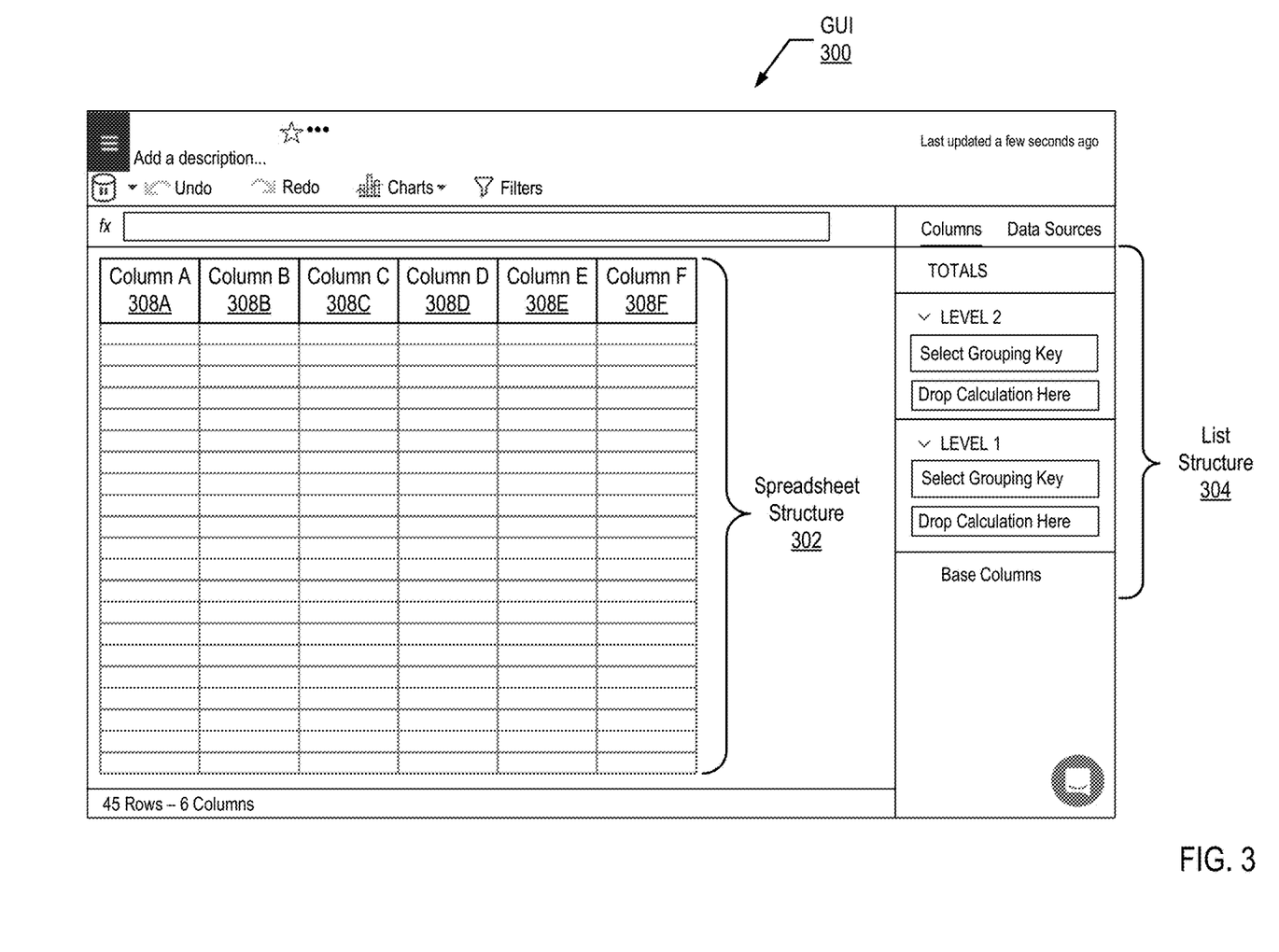
FIG. 3 sets forth a block diagram of an example graphical user interface configured for tracking errors in data set lineage according to embodiments of the present invention.

FIG. 3 shows an exemplary system for tracking errors in data set lineage according to embodiments of the present invention. As shown in FIG. 3, the exemplary GUI (202) includes a spreadsheet structure (302), a list structure (304), and an exposable parameter (306). The spreadsheet structure (302) includes a worksheet (shown as empty rows) with six columns (column A (306A), column B (306B), column C (306C), column D (306D), column E (306E), column F (306F)).

The spreadsheet structure (302) is a graphical element and organizing mechanism for a worksheet that presents a data set. A worksheet is a presentation of a data set from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculation columns that include calculation results using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The GUI (202) may also include a mechanism for a user to request data from a database to be presented as a worksheet in the GUI (202). Such a mechanism may be part of the interactivity of the worksheet. Specifically, a user may manipulate a worksheet (e.g., by dragging and dropping columns or rows, resorting columns or rows, etc.) and, in response, the GUI (202) may generate request (e.g., in the form of a state specification) for data and send the request to the data analyzer (126). Such a mechanism may also include a direct identification of the rows and columns of a database data set that a user would like to access (e.g., via a selection of the rows and columns in a dialog box).

The spreadsheet structure (302) along with the other elements of the GUI (202) make up a spreadsheet interface. The spreadsheet interface receives input from a user and generates a worksheet. The generated worksheet may be a model data set.

Figure 4:
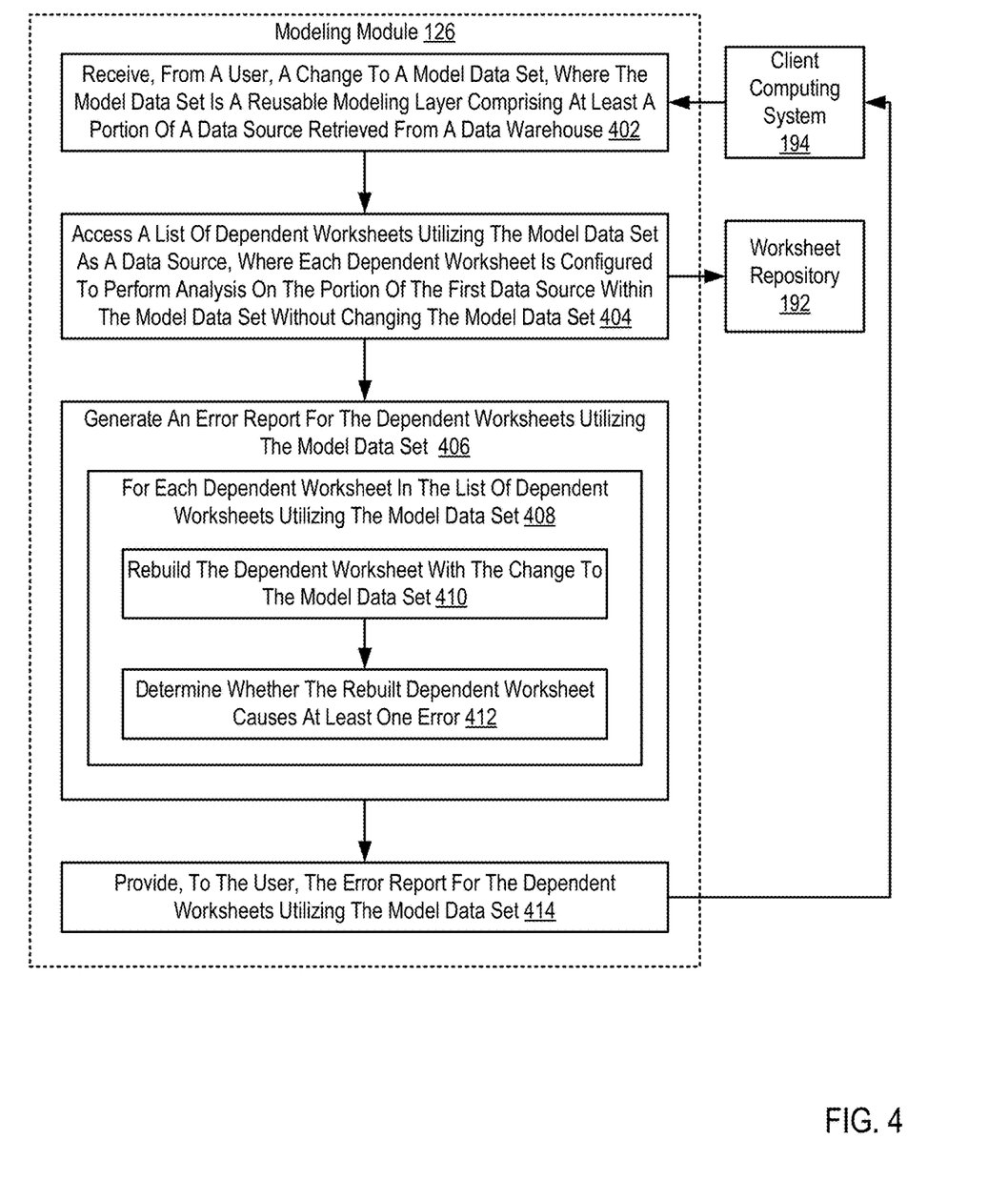
FIG. 4 sets forth a flow chart illustrating an exemplary method for tracking errors in data set lineage according to embodiments of the present invention.

For further explanation, FIG. 4 sets forth a flow chart illustrating an exemplary method for tracking errors in data set lineage according to embodiments of the present invention that includes receiving (402), from a user, a change to a model data set, wherein the model data set is a reusable modeling layer comprising at least a portion of a data source retrieved from a data warehouse. Receiving (402), from a user, a change to a model data set, wherein the model data set is a reusable modeling layer comprising at least a portion of a data source retrieved from a data warehouse may be carried out by the modeling module (126) detecting that a user has made an alteration to the model data set. The modeling module (126) may also determine whether the change to the model data set is a type of change that triggers an error report. For example, resizing a column may not trigger an error report, while removing a column may trigger an error report.

The method of FIG. 4 further includes accessing (404) a list of dependent worksheets utilizing the model data set as a data source, wherein each dependent worksheet is configured to perform analysis on the portion of the first data source within the model data set without changing the model data set. Accessing (404) a list of dependent worksheets utilizing the model data set as a data source, wherein each dependent worksheet is configured to perform analysis on the portion of the first data source within the model data set without changing the model data set may be carried out by the modeling module (126) retrieving the list of dependent worksheets from the metadata for the model data set or from a separate file location in the worksheet repository. Alternatively, the list of dependent worksheets may be created dynamically by searching the metadata for each worksheet in the worksheet repository. Each worksheet with metadata indicating that the model data set is a data source for that worksheet is added to the list of dependent worksheets.

The method of FIG. 4 further includes generating (406) an error report for the dependent worksheets utilizing the model data set including, for each dependent worksheet in the list of dependent worksheets utilizing the model data set (408): rebuilding (410) the dependent worksheet with the change to the model data set; and determining (412) whether the rebuilt dependent worksheet causes at least one error.

Rebuilding (410) the dependent worksheet with the change to the model data set may be carried out by the modeling module (126) using the metadata for the dependent worksheet to create the worksheet and adjusting the dependent worksheet based on the change to the model data set.

The dependent worksheet may be rebuilt in a variety of ways. The dependent worksheet may be rebuilt by generating a database query from the metadata for the model data set, issuing the database query to the database, and using the results of the database query to populate the dependent worksheet. The same may be done for any other data sources for the dependent worksheet. Alternatively, rebuilding (410) the dependent worksheet with the change to the model data set may be carried out by rebuilding the dependent worksheet without retrieving the data source from the data warehouse. The dependent worksheet may be rebuilt without populating the worksheet with any data to determine if the change is such that an error would be caused. The dependent worksheet may also be rebuilt using a local data source not from the cloud-based data warehouse.

Determining (412) whether the rebuilt dependent worksheet causes at least one error may be carried out by the modeling module (126) evaluating the rebuilt dependent worksheet to determine if the change to the model data set caused some or all of the dependent worksheet to be unrenderable or unpresentable. For example, determining (412) whether the rebuilt dependent worksheet causes at least one error may be carried out by determining whether a function in the rebuilt dependent worksheet refers to a removed element, such as a removed column. If column is removed from the model data set, then any function in dependent worksheets that reference a value in the removed column would cause an error. However, if no dependent worksheets reference the removed column, then no error may be found. Other examples of activities that may cause errors include, but is not limited to, renaming a column in the model data set, hiding a column in the model data set, removing a column in the model data set, removing a table used in the model data set, and removing a data source in the model data set.

The method of FIG. 4 further includes providing (414), to the user, the error report for the dependent worksheets utilizing the model data set. Providing (414), to the user, the error report for the dependent worksheets utilizing the model data set may be carried out by the modeling module (126) indicating to the user that the change has resulted in the errors compiled in the error report. The error report in its entirety may be presented to the user. Alternatively, a brief version of the error report may be presented with the ability to access greater error detail.

The above limitations improve the operation of the computer system by providing a mechanism to track and present errors caused by changes to a model data set utilized by dependent worksheets. This is performed by accessing the list of dependent worksheets, rebuilding the worksheets with the change, and detecting any errors caused by the change.

Figure 5:
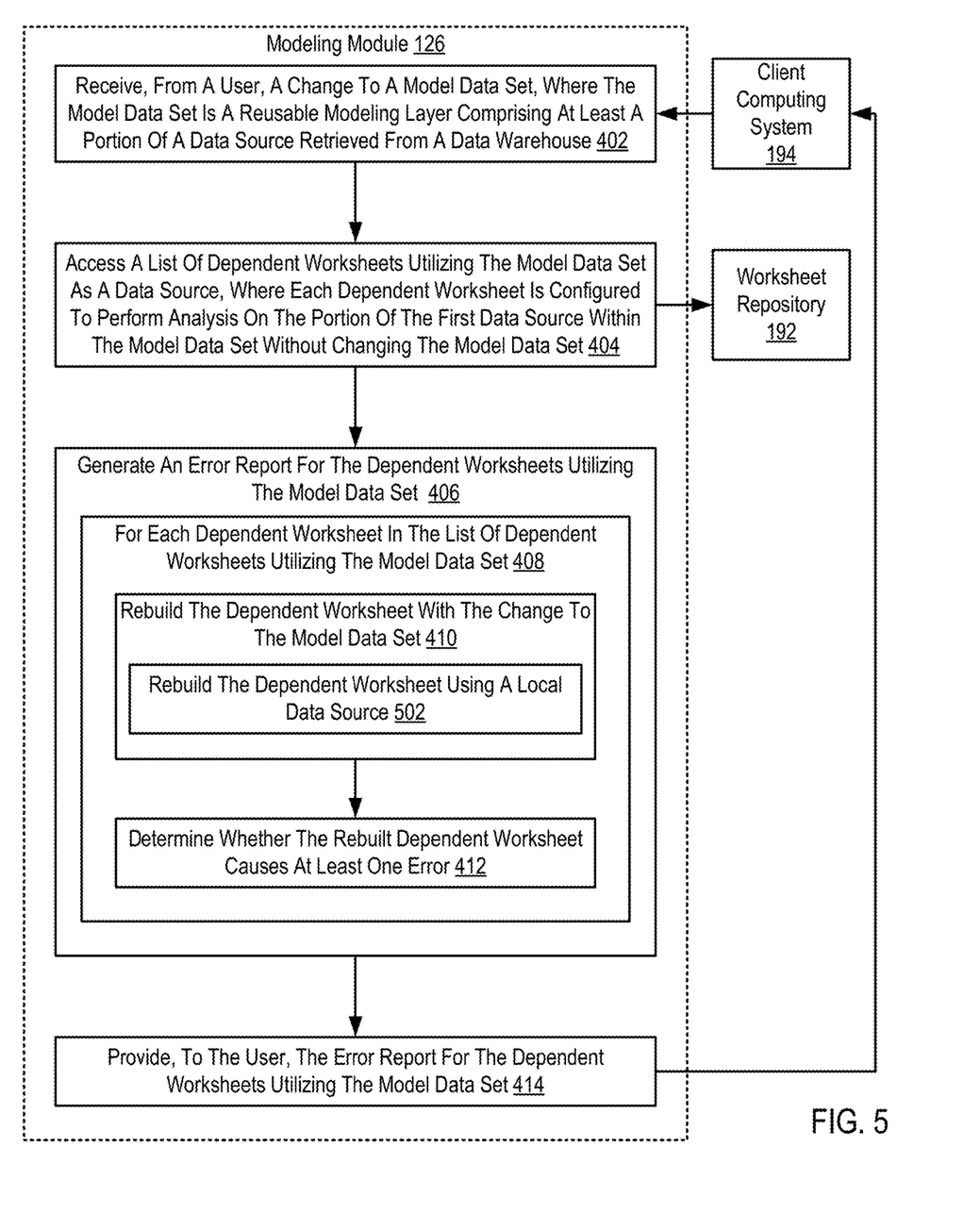
FIG. 5 sets forth a flow chart illustrating an exemplary method for tracking errors in data set lineage according to embodiments of the present invention.

For further explanation, FIG. 5 sets forth a flow chart illustrating a further exemplary method for tracking errors in data set lineage according to embodiments of the present invention that includes receiving (402), from a user, a change to a model data set, wherein the model data set is a reusable modeling layer comprising at least a portion of a data source retrieved from a data warehouse; accessing (404) a list of dependent worksheets utilizing the model data set as a data source, wherein each dependent worksheet is configured to perform analysis on the portion of the first data source within the model data set without changing the model data set; generating (406) an error report for the dependent worksheets utilizing the model data set including, for each dependent worksheet in the list of dependent worksheets utilizing the model data set (408): rebuilding (410) the dependent worksheet with the change to the model data set; and determining (412) whether the rebuilt dependent worksheet causes at least one error; and providing (414), to the user, the error report for the dependent worksheets utilizing the model data set.

The method of FIG. 5 differs from the method of FIG. 4, however, in that rebuilding (410) the dependent worksheet with the change to the model data set includes rebuilding (502) the dependent worksheet using a local data source. Rebuilding (502) the dependent worksheet using a local data source may be carried out by the modeling module (126) using a data source on the modeling module computing system, local to the modeling module computing system, or otherwise under the control of the modeling module computing system. The data source may be a cached version of the data source used to generate the model data set and dependent worksheets. Alternatively, the data source may be null data structured in a manner that conforms to the data source used to generate the model data set and dependent worksheets.

Figure 6:
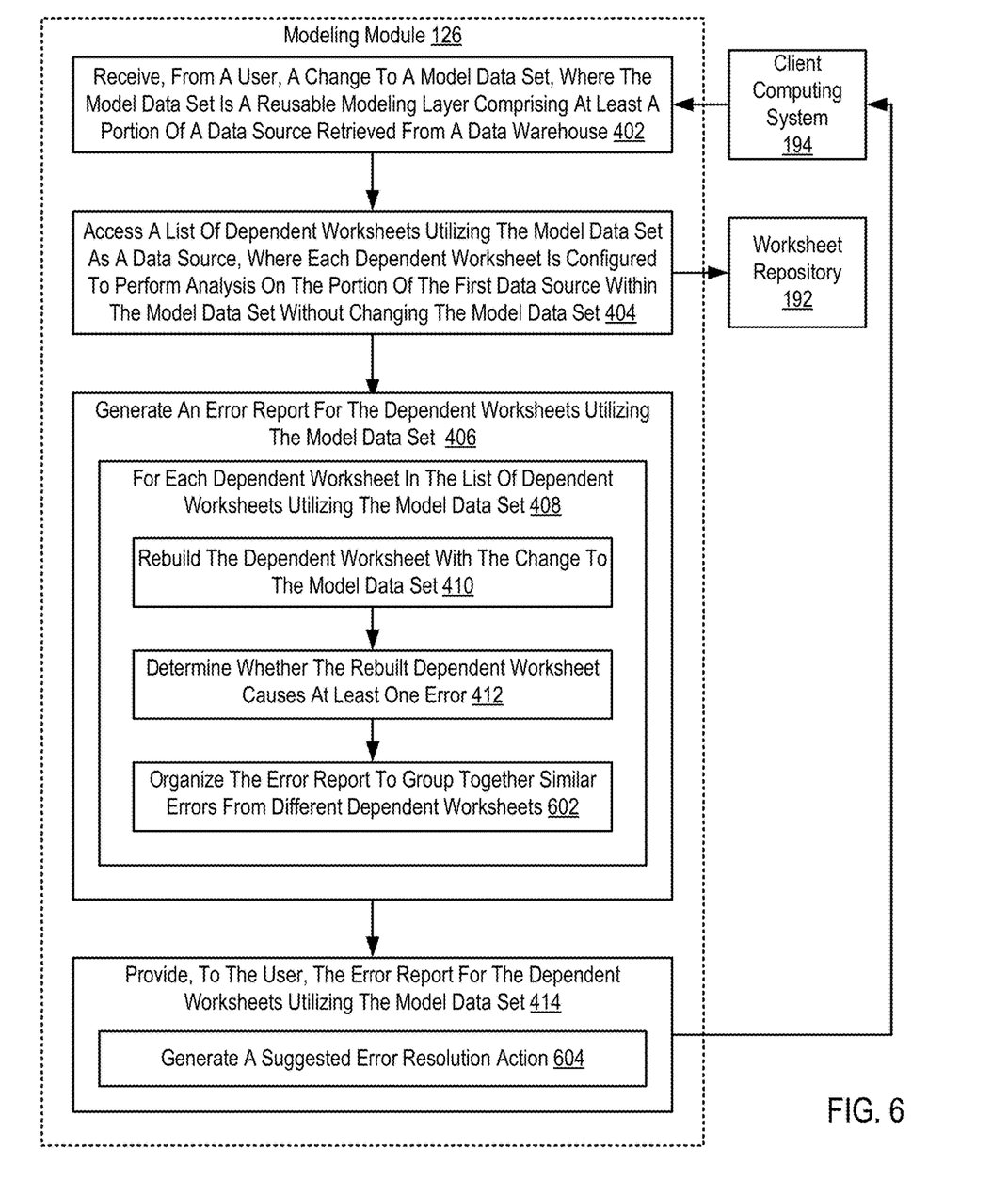
FIG. 6 sets forth a flow chart illustrating an exemplary method for tracking errors in data set lineage according to embodiments of the present invention.

For further explanation, FIG. 6 sets forth a flow chart illustrating a further exemplary method for tracking errors in data set lineage according to embodiments of the present invention that includes receiving (402), from a user, a change to a model data set, wherein the model data set is a reusable modeling layer comprising at least a portion of a data source retrieved from a data warehouse; accessing (404) a list of dependent worksheets utilizing the model data set as a data source, wherein each dependent worksheet is configured to perform analysis on the portion of the first data source within the model data set without changing the model data set; generating (406) an error report for the dependent worksheets utilizing the model data set including, for each dependent worksheet in the list of dependent worksheets utilizing the model data set (408): rebuilding (410) the dependent worksheet with the change to the model data set; and determining (412) whether the rebuilt dependent worksheet causes at least one error; and providing (414), to the user, the error report for the dependent worksheets utilizing the model data set.

The method of FIG. 6 differs from the method of FIG. 4, however, in that generating (406) an error report for the dependent worksheets utilizing the model data set further includes organizing (602) the error report to group together similar errors from different dependent worksheets. Organizing (602) the error report to group together similar errors from different dependent worksheets may be carried out by the modeling module (126) aggregating the different errors from the different dependent worksheets into different types or categories. Errors may be organized based on the specific element in the dependent worksheet or group of dependent worksheets experiencing the error. For example, if some dependent worksheet includes a function that references a now-removed column, those errors may be aggregated together with an indication of the percentage of dependent worksheets affected by the error.

The method of FIG. 6 differs from the method of FIG. 4, however, in that providing (414), to the user, the error report for the dependent worksheets utilizing the model data set includes generating (604) a suggested error resolution action. Generating (604) a suggested error resolution action may be carried out by the modeling module (126) accessing a table that maps resolution actions to error types and retrieving the resolution action for each error in the error report. The resolution actions may include automated processes that resolve the error automatically for the user.

In view of the explanations set forth above, readers will recognize that the benefits of tracking errors in data set lineage according to embodiments of the present invention include:
  Improving the operation of a computing system by providing a mechanism to track and present errors caused by changes to a model data set utilized by dependent worksheets, increasing computing system efficiency and usability.
  Improving the operation of a computing system by enabling changes to a model data set with knowledge of any potential errors caused, increasing computing system efficiency and usability.

Exemplary embodiments of the present invention are described largely in the context of a fully functional computer system for tracking errors in data set lineage. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of tracking errors in data set lineage, the method comprising:
receiving, from a client computing system, a change to a model data set, wherein the model data set is a reusable modeling layer comprising at least a portion of a first data source retrieved from a cloud-based data warehouse, wherein the model data set comprises a model data set worksheet;
accessing, from a worksheet repository, a list of dependent worksheets utilizing the model data set worksheet as a second data source wherein each dependent worksheet is configured to perform analysis on the portion of the first data source within the model data set worksheet without changing the model data set worksheet;
generating, based on the change to the model data set, an error report for the dependent worksheets utilizing the model data set including, for each dependent worksheet in the list of dependent worksheets utilizing the model data set:
rebuilding the dependent worksheet with the change to the model data set, including retrieving the first data source and the second data source and populating the dependent worksheet with the first data source and the second data source; and
determining whether the rebuilt dependent worksheet causes at least one error, including evaluating the rebuilt dependent worksheet for unrenderable results caused by referral to a removed element from within the model data set; and providing, to the client computing system, the error report for the dependent worksheets utilizing the model data set.

2. The method of claim 1, wherein rebuilding the dependent worksheet with the change to the model data set comprises rebuilding the dependent worksheet without retrieving the data source from the data warehouse.

3. The method of claim 1, wherein rebuilding the dependent worksheet with the change to the model data set comprises rebuilding the dependent worksheet using a local data source.

4. The method of claim 1, wherein generating the error report for the dependent worksheets utilizing the model data set further comprises organizing the error report to group together similar errors from different dependent worksheets.

5. The method of claim 1, wherein providing, to the client computing system, the error report for the dependent worksheets utilizing the model data set comprises generating a suggested error resolution action.

6. The method of claim 1, wherein determining whether the rebuilt dependent worksheet causes the at least one error comprises determining whether a function in the rebuilt dependent worksheet refers to a removed column within the model data set.

7. The method of claim 1, wherein the change to the model data set is a change to a column of the model data set.

8. An apparatus for tracking errors in data set lineage, the apparatus comprising a computer processor, a computer memory operatively coupled to the computer processor, the computer memory having disposed within it computer program instructions that, when executed by the computer processor, cause the apparatus to carry out the steps of:

receiving, from a client computing system, a change to a model data set, wherein the model data set is a reusable modeling layer comprising at least a portion of a first data source retrieved from a cloud-based data warehouse, wherein the model data set comprises a model data set worksheet;

accessing, from a worksheet repository, a list of dependent worksheets utilizing the model data set worksheet as a second data source wherein each dependent worksheet is configured to perform analysis on the portion of the first data source within the model data set worksheet without changing the model data set worksheet;

generating, based on the change to the model data set, an error report for the dependent worksheets utilizing the model data set including, for each dependent worksheet in the list of dependent worksheets utilizing the model data set:

rebuilding the dependent worksheet with the change to the model data set, including retrieving the first data source and the second data source and populating the dependent worksheet with the first data source and the second data source; and determining whether the rebuilt dependent worksheet causes at least one error, including evaluating the rebuilt dependent worksheet for unrenderable results caused by referral to a removed element from within the model data set; and providing, to the client computing system, the error report for the dependent worksheets utilizing the model data set.

9. The apparatus of claim 8, wherein rebuilding the dependent worksheet with the change to the model data set comprises rebuilding the dependent worksheet without retrieving the data source from the data warehouse.

10. The apparatus of claim 8, wherein rebuilding the dependent worksheet with the change to the model data set comprises rebuilding the dependent worksheet using a local data source.

11. The apparatus of claim 8, wherein generating the error report for the dependent worksheets utilizing the model data set further comprises organizing the error report to group together similar errors from different dependent worksheets.

12. The apparatus of claim 8, wherein providing, to the client computing system, the error report for the dependent worksheets utilizing the model data set comprises generating a suggested error resolution action.

13. The apparatus of claim 8, wherein determining whether the rebuilt dependent worksheet causes the at least one error comprises determining whether a function in the rebuilt dependent worksheet refers to a removed column within the model data set.

14. The apparatus of claim 8, wherein the change to the model data set is a change to a column of the model data set.

15. A non-transitory computer readable medium for tracking errors in data set lineage, the non-transitory computer readable medium storing computer program instructions that, when executed, cause a computer to carry out the steps of:

receiving, from a client computing system, a change to a model data set, wherein the model data set is a reusable modeling layer comprising at least a portion of a first data source retrieved from a cloud-based data warehouse, wherein the model data set comprises a model data set worksheet;

accessing, from a worksheet repository, a list of dependent worksheets utilizing the model data set worksheet as a second data source wherein each dependent worksheet is configured to perform analysis on the portion of the first data source within the model data set worksheet without changing the model data set worksheet;

generating, based on the change to the model data set, an error report for the dependent worksheets utilizing the model data set including, for each dependent worksheet in the list of dependent worksheets utilizing the model data set:

rebuilding the dependent worksheet with the change to the model data set, including retrieving the first data source and the second data source and populating the dependent worksheet with the first data source and the second data source; and determining whether the rebuilt dependent worksheet causes at least one error, including evaluating the rebuilt dependent worksheet for unrenderable results caused by referral to a removed element from within the model data set; and providing, to the client computing system, the error report for the dependent worksheets utilizing the model data set.

16. The non-transitory computer readable medium of claim 15, wherein rebuilding the dependent worksheet with the change to the model data set comprises rebuilding the dependent worksheet without retrieving the data source from the data warehouse.

17. The non-transitory computer readable medium of claim 15, wherein rebuilding the dependent worksheet with the change to the model data set comprises rebuilding the dependent worksheet using a local data source.

18. The non-transitory computer readable medium of claim 15, wherein generating the error report for the dependent worksheets utilizing the model data set further comprises organizing the error report to group together similar errors from different dependent worksheets.

19. The non-transitory computer readable medium of claim 15, wherein providing, to the client computing system, the error report for the dependent worksheets utilizing the model data set comprises generating a suggested error resolution action.

20. The non-transitory computer readable medium of claim 15, wherein determining whether the rebuilt dependent worksheet causes the at least one error comprises determining whether a function in the rebuilt dependent worksheet refers to a removed column within the model data set.

* * * * *